(12) United States Patent
Lewis et al.

(10) Patent No.: US 7,877,197 B2
(45) Date of Patent: Jan. 25, 2011

(54) SYSTEMS AND METHODS FOR REAL-TIME CONFLICT-CHECKED, OPERATIONALLY PREFERRED FLIGHT TRAJECTORY REVISION RECOMMENDATIONS

(75) Inventors: Michael S. Lewis, Round Hill, VA (US); Reza T. Holland, Sterling, VA (US)

(73) Assignee: The Boeing Company, Chicago, IL (US)

( * ) Notice: Subject to any disclaimer, the term of this patent is extended or adjusted under 35 U.S.C. 154(b) by 924 days.

(21) Appl. No.: 11/749,079

(22) Filed: May 15, 2007

(65) Prior Publication Data

US 2008/0288164 A1    Nov. 20, 2008

(51) Int. Cl.
  *G05D 1/00*  (2006.01)
  *G08G 5/00*  (2006.01)
  *G06F 19/00* (2006.01)

(52) U.S. Cl. .................. 701/120; 701/35; 701/121; 342/453

(58) Field of Classification Search .................. 701/120, 701/121, 122, 35, 3, 4, 10; 705/35, 9, 7; 342/454, 450, 456
  See application file for complete search history.

(56) References Cited

U.S. PATENT DOCUMENTS

| | | | |
|---|---|---|---|
| 6,020,831 A * | 2/2000 | Nishida et al. | 340/945 |
| 6,314,362 B1 | 11/2001 | Erzberger et al. | |
| 6,463,383 B1 * | 10/2002 | Baiada et al. | 701/120 |
| 6,584,400 B2 * | 6/2003 | Beardsworth | 701/120 |
| 2004/0039518 A1 * | 2/2004 | Jasselin | 701/120 |
| 2005/0261808 A1 * | 11/2005 | Artini et al. | 701/3 |
| 2006/0089760 A1 * | 4/2006 | Love et al. | 701/4 |

* cited by examiner

*Primary Examiner*—Tan Q Nguyen
(74) *Attorney, Agent, or Firm*—Lee & Hayes, PLLC (57) ABSTRACT

Systems and methods for actively seeking and generating real-time, conflict-checked, operationally preferred flight trajectory revision recommendations are disclosed. The system analyzes air traffic based on a plurality of uniquely integrated inputs, to produce at least one conflict-checked, operationally preferred flight trajectory revision opportunity for an operating vehicle, and a communications component configured to communicate the at least one conflict-checked flight trajectory revision. In one embodiment, the system interfaces with the airspace user's operations center (e.g. Airline Operations Center), to communicate the operationally preferred flight trajectory revision opportunity, and allow the operator to make the decision whether to implement, and request the same from the Air Navigation Service Provider. In another embodiment, the system interfaces with the Air Navigation Service Provider, and while considering operator business objectives, and other constraints, directly aides the air traffic controller in determining more optimal flight trajectory revision opportunities.

20 Claims, 6 Drawing Sheets

SYSTEMS AND METHODS FOR REAL-TIME CONFLICT-CHECKED, OPERATIONALLY PREFERRED FLIGHT TRAJECTORY REVISION RECOMMENDATIONS

FIELD OF THE INVENTION

The field of the present disclosure relates to aircraft traffic management, and more specifically, to systems and methods for actively seeking and generating real-time, conflict-checked, operationally preferred flight trajectory revision recommendations.

BACKGROUND

Operational planning for commercial airline flights typically begins days to months in advance, anticipating demand, future traffic congestion, weather and other considerations. In the United States, for example, the operational planning function is generally conducted by an airline's Airline Operations Control (AOC) center. In parallel, Air Traffic Control (ATC) has its own set of services and functions. ATC manages aviation traffic in a block of airspace on behalf of a country or region, and is often a governmental organization. Airspace configuration and management begins days to months in advance of an actual flight, taking into consideration anticipated demand, probable congestion points due to weather or traffic, and other constraints.

Figure 1:
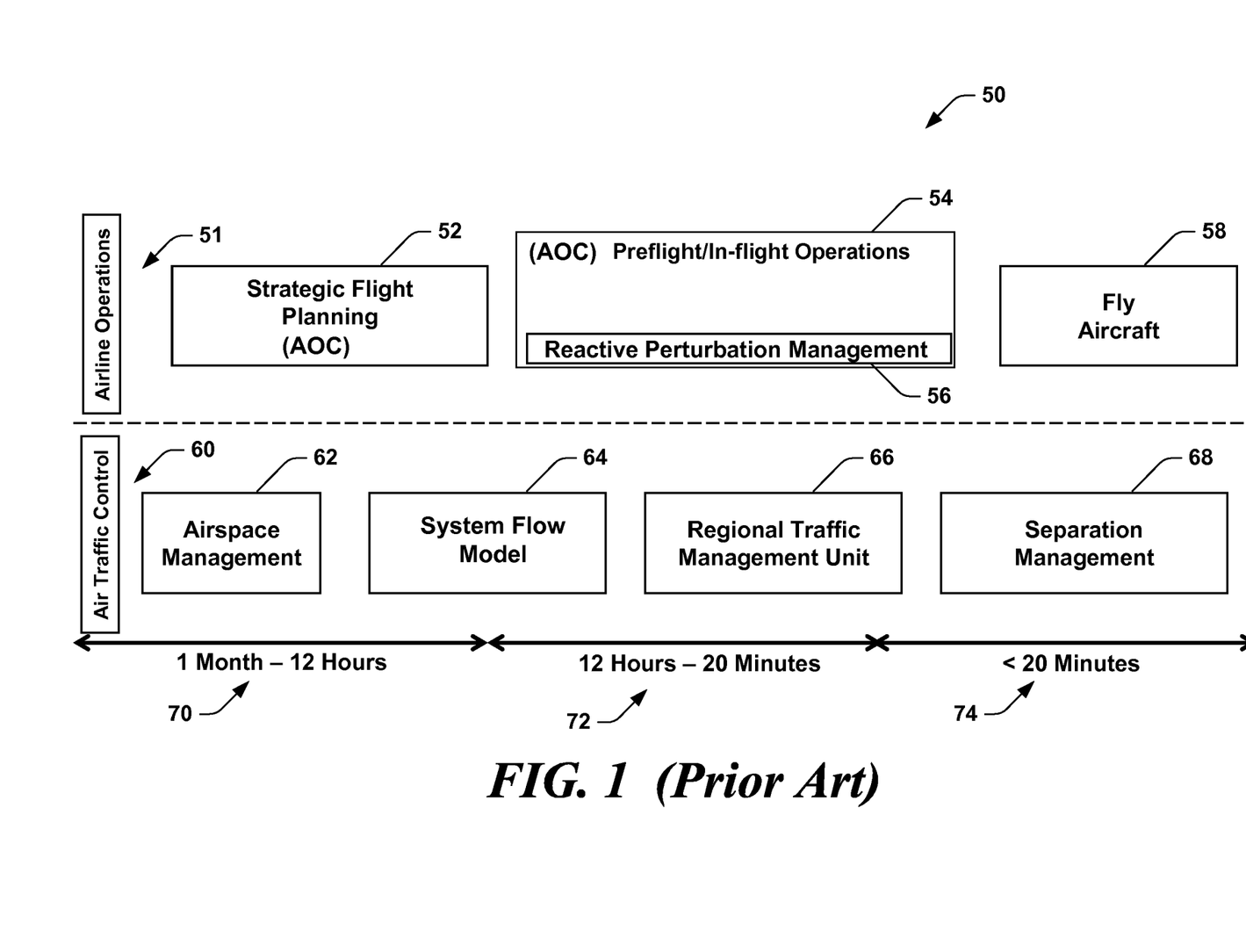
FIG. 1 shows an aircraft operational environment in accordance with the prior art.

For example, FIG. 1 shows airline and air traffic control operating environment 50 in accordance with the prior art. The environment 50 includes an airline operations portion 51 (typically performed by the AOC center), and an air traffic control portion 60 (typically performed by ATC). During a look-ahead period 70 (e.g. approximately 1 month to 12 hours), an airspace management component 62 and a system flow management component 64 of the air traffic control portion 60 perform long-term, pre-flight planning operations. These operations are performed in parallel to, and semi-coordinated with strategic flight planning component 52 of the airline operations portion 51, typically performed by an airline's AOC.

Working in a collaborative manner with airlines and other system users, ATC is responsible for overall air traffic management. This high level, strategic national process becomes a more tactical regional traffic management process closer to the actual time of operation. More specifically, as shown in FIG. 1, during look-ahead period 72 (e.g. approximately 12 hours to 20 minutes), a regional traffic management unit 66 of the air traffic control portion 60 performs intermediate-term planning and air traffic management operations. These operations are conducted in parallel to an AOC preflight/in-flight operations component 54 of the airline operations portion 51. In this time window the airline's Operations Center is primarily in a reactive mode, responding to system dynamics and perturbations which would otherwise have an adverse effect on planned operations (i.e. airline schedule). This function is referenced here as "Reactive Perturbation Management" 56.

As shown in FIG. 1, during look-ahead period 74 (e.g. approximately 20 minutes out), a flight component 58 of the airline operations portion 51 operates the aircraft, and a separation management component 68 of the air traffic control portion 60 performs separation management functions to manage and prevent conflicts to ensure safety of flight.

Although desirable results have been achieved using existing air traffic management systems, there may be room for improvement. For example, at times, a flight route may be planned non-optimally to avoid a congestion point or anticipated convective weather cells. Additionally, if that event does not materialize, or is only relevant for a short period of time, traffic flows and individual flights may operate less optimally than otherwise possible. Similarly, as wind patterns develop, certain trajectories of flight not in the original flight plan may become preferable from an efficiency standpoint.

Some efforts have been made to address such undesirable circumstances, including, for example, the "Direct To" tool developed by the National Aeronautics and Space Administration, and the User Request Evaluation Tool developed by The Mitre Corporation of McLean, Va. Such existing systems and methods for air traffic management, however, are configured for use by air traffic controllers having a somewhat limited perspective, and are not particularly well-suited to enable user-preferred (e.g. airline requested) real-time flight trajectory revisions.

SUMMARY

Systems and methods for actively seeking and generating real-time, conflict-checked, operationally preferred flight trajectory revision recommendations are disclosed. Embodiments of systems and methods in accordance with the present disclosure may provide significant advantages, including improved efficiency, lower costs, reduced emissions, reduced congestion and other operational advantages.

In one embodiment, a system for analyzing air traffic based on a plurality of uniquely integrated inputs, produces at least one conflict-checked, operationally preferred flight trajectory revision for an operating vehicle, and a communications component configured to communicate the at least one conflict-checked flight trajectory revision. The plurality of inputs to the system can include, but is not limited to: airline operational preferences specific to an individual aircraft or flows of aircraft, live air traffic surveillance data, flight plan data, weather and wind data, high fidelity aircraft performance models, airline-specific objectives, and other relevant data. Based on the plurality of inputs, the system is configured to actively search for and determine at least one conflict-checked flight trajectory revision for the operating air vehicle. The at least one conflict-checked flight trajectory revision at least partially improves the chances of meeting the operator-specified objectives. The communication component communicates the at least one conflict-checked flight trajectory revision to the airspace user and/or Air Navigation Service Provider.

Another embodiment includes a method of operating an air vehicle based on a plurality of inputs, and determining at least one conflict-checked flight trajectory revision for an operating air vehicle based on the plurality of inputs and operator-specified objectives, providing the at least one conflict-checked flight trajectory revision to an airspace user, and upon approval of the at least one conflict-checked flight trajectory revision by the user, proposing the at least one conflict-checked flight trajectory revision to an air traffic controller.

A further embodiment includes a method of advising Air Navigation Service Provider (ANSP) by determining at least one conflict-checked flight trajectory revision for an operating air vehicle that at least partially satisfies an ANSP objective, and is at minimum neutral (or at best beneficial) to airspace user business objectives.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

The present disclosure teaches systems and methods for actively seeking and generating real-time, conflict-checked, operationally preferred flight trajectory revision recommendations. Many specific details of certain embodiments of the invention are set forth in the following description and in FIGS. 2-7 to provide a thorough understanding of such embodiments. It will be appreciated, however, that a variety of alternate embodiments may be conceived, and that various embodiments may be practiced without several of the details described in the following description.

In general, embodiments of systems and methods in accordance with the present disclosure analyze a variety of inputs regarding an end-to-end operating environment of an aircraft (including during flight), identify possible improvement opportunities based on one or more user-provided objectives (e.g. improved fuel economy, reduced flight time, improved emissions, mitigating traffic congestion, time of arrival, etc.), and advise an operating entity (e.g. an AOC center or ATC) of such opportunities. An example opportunity could be to bypass the next navigation point or "fix" in the current flight plan and proceed directly to a downstream fix on the flight plan, thus saving minutes and fuel in flight. Another example opportunity could be to request a higher altitude, thus operating more efficiently and saving fuel. Based on the information, an airline could determine and request a conflict-checked, real-time flight trajectory revision to take advantage of the improvement opportunity. If a governing air traffic authority (e.g. an ANSP) grants the request, the flight trajectory of the aircraft could be revised to take advantage of the opportunity.

Figure 2:
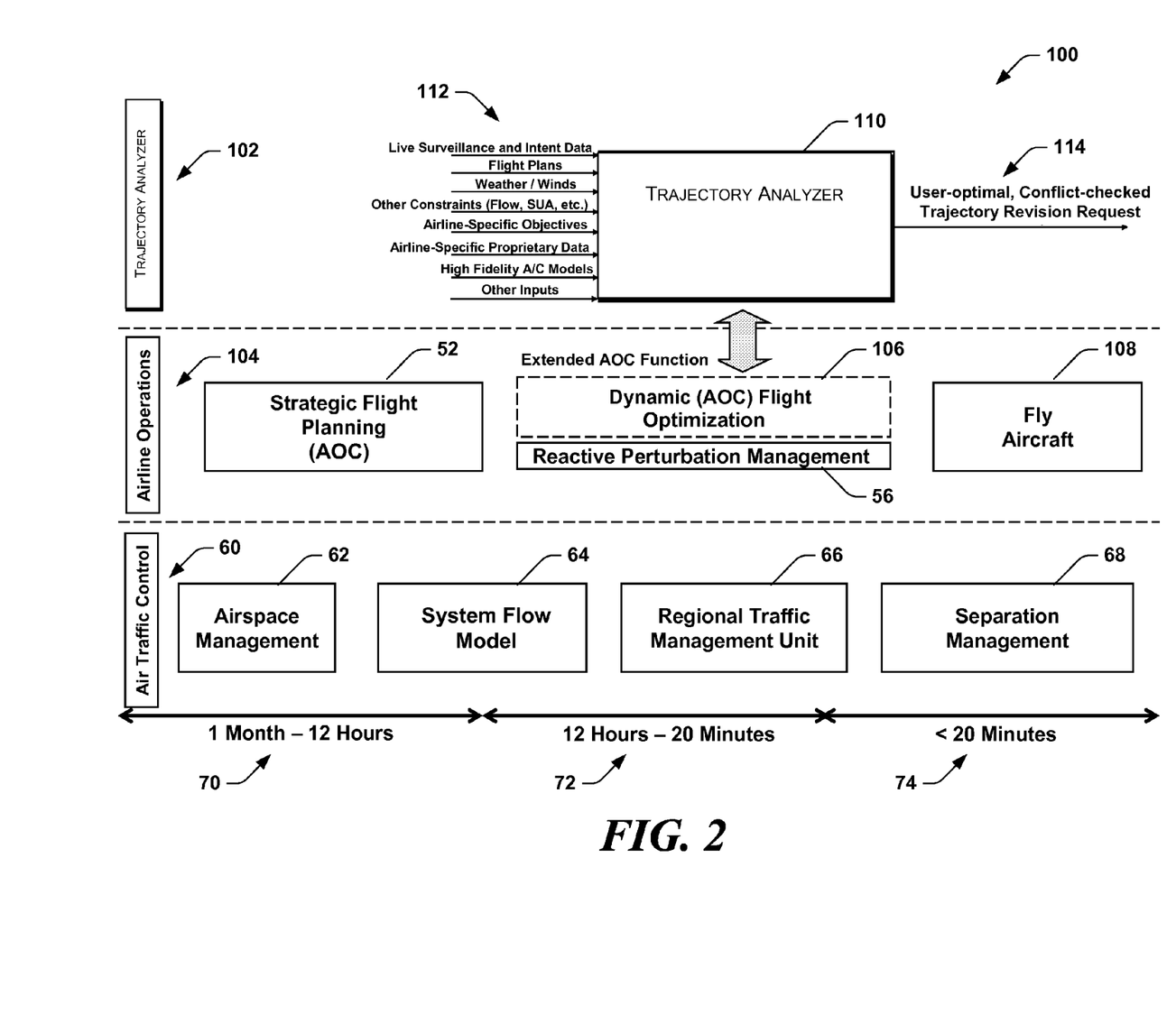
FIG. 2 shows an exemplary environment for implementing systems and methods for trajectory analysis in accordance with an embodiment of the invention.

For example, FIG. 2 shows an exemplary environment 100 for implementing systems and methods for trajectory analysis in accordance with embodiments of the invention. In this embodiment, the environment 100 includes a trajectory analysis portion 102 that operatively communicates with the airline operations portion 104 and the air traffic control portion 60. Some of the components of the exemplary environment 100 are substantially the same as the prior art environment 50 described above with respect to FIG. 1, and for the sake of brevity, the operational aspects of those components will not be repeated.

In this embodiment, the trajectory analysis portion 102 includes a trajectory analyzer 110 that analyzes a set of inputs 112 and identifies one or more improvement opportunities 114. The inputs 112 may include a variety of information regarding the operational environment of the aircraft. The one or more improvement opportunities 114 are identified to a dynamic AOC component 106 of an airline operations portion 104 during one or both of the second and third look-ahead periods 72, 74.

In some embodiments, the improvement opportunities 114 may be conflict-checked, real-time flight trajectory revision opportunities. Furthermore, the efficiency improvement opportunity 114 may accomplish an operational objective, such as fuel reduction or congestion mitigation. Also the efficiency improvements may recommend tactics in addition to trajectory re-routing (e.g. speed adjusts).

The inputs 112 to the trajectory analyzer 110 may include, for example, live surveillance and intent data, flight plans, weather and wind information, constraint information (e.g. special use airspace (SUA)), airline-specific objectives, airline-specific proprietary data, high fidelity aircraft models, and other possible inputs. The trajectory analyzer 110 may receive the inputs 112 from various outside sources, including the AOC, the aircraft, ATC, or other suitable outside sources (e.g. third-party data provider or Aeronautical Information Management (AIM) system). Alternately, the trajectory analyzer 110 may determine at least some of the inputs 112 independently.

Referring again to FIG. 2, if the dynamic AOC component 106 approves of an identified improvement opportunity 114, the improvement opportunity 114 may be communicated in a request to the air traffic control portion 60. The air traffic control portion 60 may consider the request (e.g. via the separation management component 68), and may grant or deny the requested revision. The air traffic control portion 60 retains its separation management functions and the authority to manage and prevent conflicts to ensure safety of life. Based on the decision of the air traffic control portion 60, the operation of the aircraft may be adjusted or maintained by a flight component 108 of the airline operations portion 104.

Embodiments of systems and methods in accordance with the teachings of the present disclosure may advantageously combine both public and private data together in a manner that may not be feasible or possible in an exclusively government environment. For example, such embodiments may take into consideration various user-specified objectives, user-specified proprietary data, and other possible user-specified inputs. Air traffic control operators currently have no means of pursuing such user-specified preferences in the context of a government-controlled ATC. Thus, embodiments in accordance with the present disclosure can ingest such user preferences and seek improvements that take into account individual operator goals.

An airline-specified input may include information that a certain flight holds many high value connecting passengers and should receive a correspondingly high priority, or that another flight may not have its gate available at its destination and may actually benefit from slowing down in the en route environment. Similarly, assume multiple flights are operating inbound to a busy hub and crossing the same merge point or arriving on the same runway. A flight with many international connecting passengers or a crew with a tight connection, for example, may be given multiple direct-to options and speed increases to get the flight to the destination as quickly as feasible. Another flight with fewer connecting or high value passengers or no crew or aircraft constraints may be permitted to fall further back in the queue.

In addition, embodiments of systems and methods in accordance with the present disclosure may identify possible flight trajectory revisions that aid ATC in addressing congestion, flows or other operational issues. As discussed above, the ATC is focused first and foremost on safety. But the ATC still deals with weather, congestion and often needs to quickly find a solution for moving air traffic through airspace that is either congested or has lost capacity. Often this results in holding patterns if aircraft are already airborne. Embodiments in accordance with the present disclosure can provide ATC flight trajectory revision recommendations for individual operations that are neutral to an operator or even improve operator efficiency. Such requests can be designed to manage congestion and pre-align aircraft to flow better through the air traffic system, thereby offering a means for the ATC to remain focused on safety while also receiving third party support to manage congestion in a manner that is neutral at worst, and efficient at best, to the operators.

Figure 3:
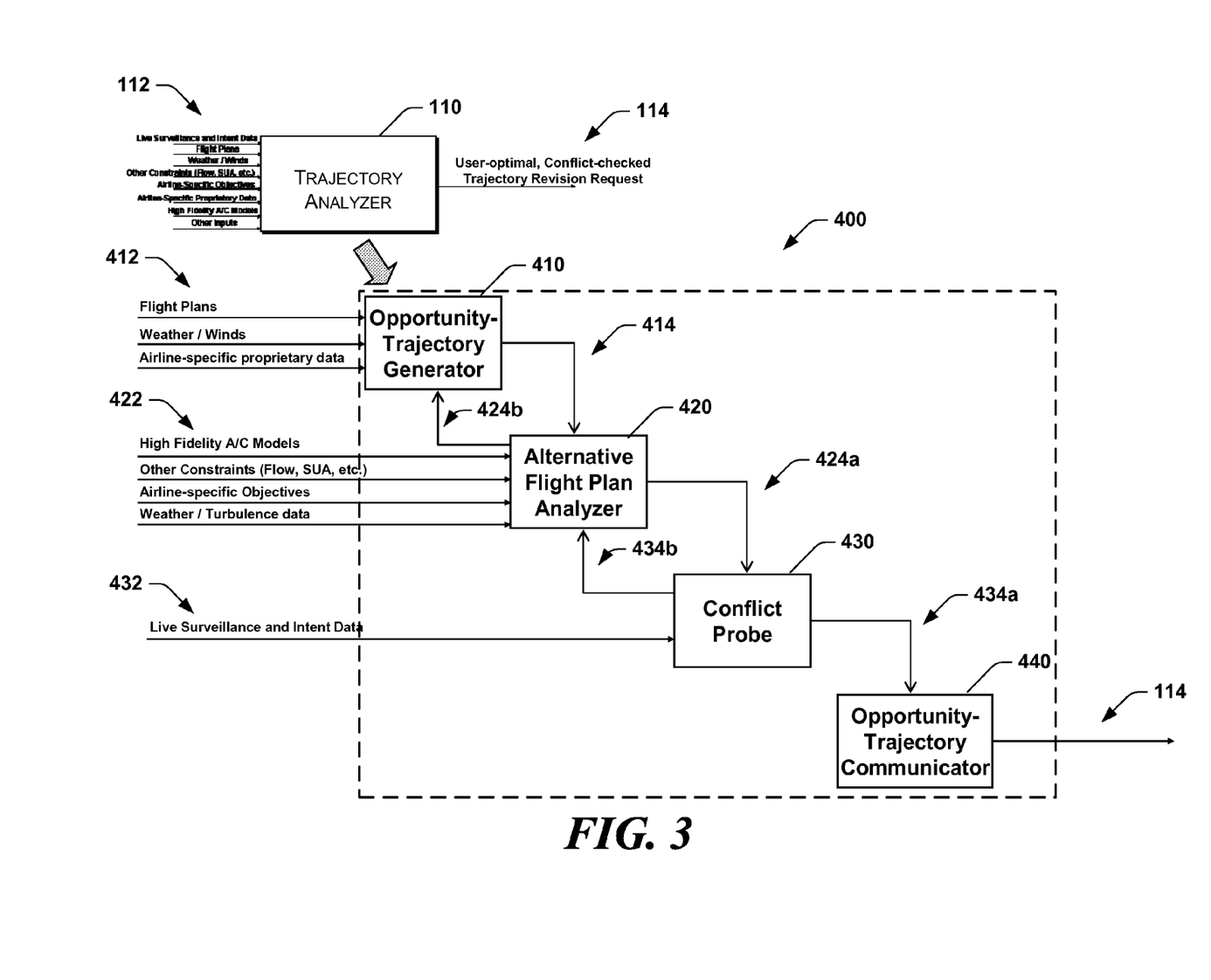
FIG. 3 is a block diagram of a trajectory analyzer in accordance with an embodiment of the invention.

It will be appreciated that the trajectory analyzer 110 may be implemented in a variety of ways. For example, FIG. 3 is a block diagram of a trajectory analyzer 400 in accordance with an embodiment of the invention. The trajectory analyzer 400 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations.

In this embodiment, the trajectory analyzer 400 includes an opportunity trajectory generator 410, an alternative flight plan analyzer 420, a conflict probe 430, and an opportunity trajectory communicator 440. As shown in FIG. 3, the opportunity trajectory generator 410 receives a first set of inputs 412. In some embodiments, the first set of inputs 412 includes flight plans, weather and wind information, and user-specific proprietary information. The opportunity trajectory generator 410 analyzes the first set of inputs 412 and outputs one or more possible opportunity trajectories 414.

More specifically, the opportunity trajectory generator 410 analyzes a plurality of possible flight re-plan scenarios which are operationally preferred to the currently filed trajectory. This sub-function may not consider all operator or air traffic control constraints. Furthermore, in some embodiments, this sub-function may be parameterized (or ranked) such that only options of 'significant value' are considered. The ranking (or hierarchy) of such parameters can be varied based on any number of considerations, including user preferences or business model, or other suitable considerations.

The alternative flight plan analyzer 420 receives the one or more possible opportunity trajectories 414, and a second set of inputs 422. In this embodiment, the second set of inputs 422 includes one or more high fidelity aircraft performance models, constraint information (e.g. special use airspace (SUA)), user-specific objectives, and weather and turbulence data. The alternative flight plan analyzer 420 analyzes the second set of inputs 422, and the one or more possible opportunity trajectories 414 from the opportunity trajectory generator 410, and outputs one or more alternative flight plans 424a to the conflict probe 430, and one or more alternative flight plans 424b back to the opportunity trajectory generator 410.

More specifically, the alternative flight plan analyzer 420 further converges on opportunities that meet one or more selected criteria, including operator business objectives, ATC constraints, weather and turbulence constraints, and aircraft performance characteristics. Like the opportunity trajectory generator 410, this sub-function may also be parameterized such that tolerances can be user-specified.

The conflict probe 430 receives the one or more alternative flight plans 424a, and a third set of inputs 432. In this embodiment, the third set of inputs 432 includes live surveillance and intent data. The conflict probe 430 analyzes these inputs, determines whether possible conflicts with other aircraft exist, and outputs conflicts information 434a to the opportunity trajectory communicator 440. The conflict probe 430 also returns conflicts information 434b to the alternative flight plan analyzer 420.

More specifically, the conflict probe 430 includes a trajectory prediction capability which projects aircraft positions based on one or more variables, including current state vector, historical flight path, and filed flight plan. With such projections, the conflict probe sub-function is able to predict conflicts which may arise with other traffic should the opportunity trajectory be implemented. This sub-function is also able to model and check conflicts with not only a single aircraft (i.e. pair-wise conflict detection) but also with a group of aircraft (traffic flows), convective weather cells, turbulence, special use airspace, or any other no fly zones. This sub-function may also be parameterized such that the conflict tolerance can be user-specified (e.g. varying degrees of conflict tolerance, separation buffers, severity of conflict, etc.). The output of this sub-function 434a is a conflict-checked re route opportunity to be provided to an airspace user.

The above-described actions of the opportunity trajectory generator 410, the alternative flight plan analyzer 420, and the conflict probe 430 may be iteratively repeated until a conflict-checked, best available efficiency improvement opportunity 114 is determined. After a suitably converged solution is achieved, the efficiency improvement opportunity 114 is output by the opportunity trajectory communicator 440.

In this way, some embodiments of trajectory analyzers in accordance with the teachings of the present disclosure search for efficiency improvements on behalf of the user and provide the user with de-conflicted efficiency improvements that they can request to air traffic governing authorities for implementation. The controller (e.g. ATC 106) may then examine the request and issue an approval (or denial). This process is consistent with today's operation and requires no change to existing operational procedures. Such embodiments provide knowledge of opportunities to the operator so the operator can request "smart asks" (i.e., conflict checked and user preferred) in the near term operating environment.

Figure 4:
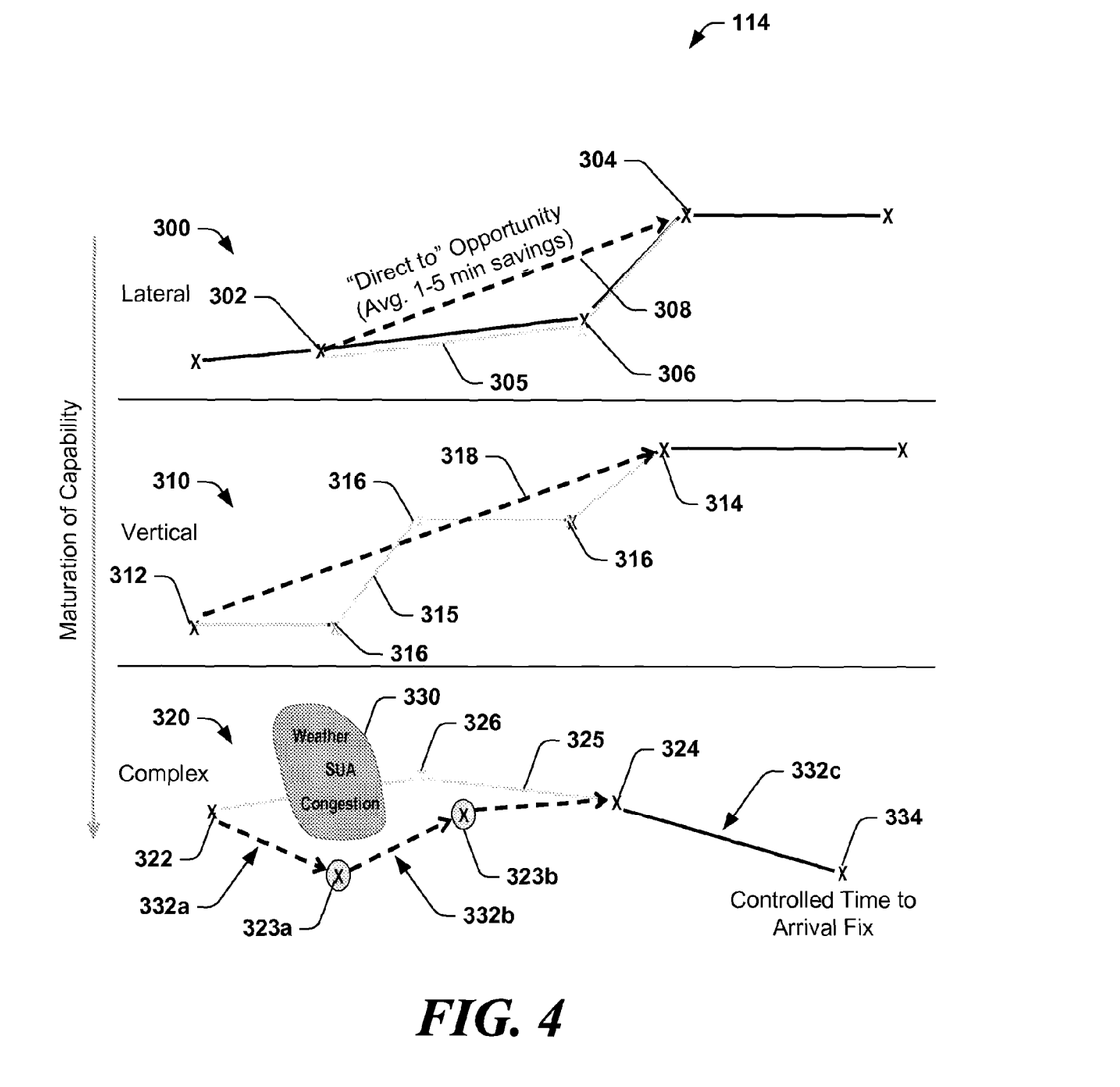
FIG. 4 shows exemplary improvement opportunities that may be identified by the trajectory analyzer of FIG. 3.

For example, FIG. 4 shows exemplary efficiency improvement opportunities 114 that may be identified by the trajectory analyzer 110 of FIG. 2. In a lateral improvement opportunity 300, the trajectory analyzer 110 may identify an efficiency improvement that involves proceeding from a first waypoint 302 to a second waypoint 304 along a pre-planned flight path 305, bypassing (or "skipping") an intermediate waypoint 306 that is laterally displaced from a revised path 308 between the first and second waypoints 302, 304. The lateral improvement opportunity 300 may be of a type known as a "direct to" improvement opportunity, and may be determined based on one or more of the inputs 112, including, for example, wind information. In some embodiments, the lateral improvement opportunity 300 may provide a time savings of approximately one to five minutes in the time of flight of the aircraft 104.

Similarly, in a vertical improvement opportunity 310, the trajectory analyzer 110 may identify an efficiency improvement that involves proceeding along a pre-planned flight path at a higher altitude (i.e., vertically displaced) than the current altitude of flight.

As further shown in FIG. 4, the trajectory analyzer 110 may identify a complex improvement opportunity 320 that involves proceeding from a first waypoint 322 to a second waypoint 324 via one or more auxiliary waypoints 323. The auxiliary waypoints 323 may be displaced from a pre-planned flight path 325 by any combination of lateral and vertical displacement, and may be determined by the trajectory analyzer 110 to avoid a constraint region 330 that has developed along the pre-planned flight path 325. The constraint region 300 may include, for example, a weather cell, an SUA, a traffic congestion region, or any other type of constraint. The auxiliary waypoints 323 may result in the aircraft 104 bypassing one or more intermediate waypoints 326 along the pre-planned flight path 325. In addition, during one or more segments 332 of a revised path 328 or the pre-planned flight path 325, the trajectory analyzer 110 may identify one or more speed adjustments of the aircraft 104 that may be used to ensure that the aircraft 104 arrives at a controlled time to arrival fix 334 (e.g. a destination airport). As shown in FIG. 4, the speed adjusts may be identified between a waypoint on the pre-planned flight path 325 and an auxiliary waypoint 323 (e.g. segment 332a), between two auxiliary waypoints 323 (e.g. segment 332b), or even between two waypoints on the pre-planned flight path 325 (e.g. segment 332c).

In some embodiments, the trajectory analyzer 400 may be configured to focus on operational improvements in the en route environment. In further embodiments, the trajectory analyzer 400 may be configured to perform a metering capability, as disclosed, for example, in U.S. Pat. No. 6,463,383 issued to Baiada and Bowlin. More specifically, in an air traffic system, certain resources (particularly airspace merge points, arrival fixes, or runways at busy airports) may become congested and drive queuing back into the air traffic system. Metering traffic to these congested points allows for an improved flow over the congestion point and less inefficient separation actions. The trajectory analyzer 400 may be configured to meter traffic toward such an arrival airport and/or airspace merge point to provide en route efficiency opportunities in a manner that is consistent with the metering requirements of airspace and runway capacity constraints.

The metering capability of the trajectory analyzer 400 may allow for improved management of the arrival phase of flight. Whether it is continuous descent approaches (CDAs) or Tailored Arrivals (TAs), there are a number of technical options for cost, noise, and emissions management during an arrival procedure. The metering capability of the trajectory analyzer 400 may deliver metered operations into an arrival environment that better enables efficient arrival procedures, and may also allow for a stream of such arrival procedures through an airspace.

In alternate embodiments, the trajectory analyzer 400 may integrate capabilities in flow management and arrival management in order to manage four-dimensional (4D) trajectory operations during the entire en route segment of flight. As used herein, the term 4D trajectory operations means that a latitude, longitude, and altitude flight path is planned with corresponding time constraints. For example, in a near term portion of flight (e.g. 1 to 45 minutes), the ATC 106 is typically focused on regional traffic management and separation management of aircraft in the system. Thus, the air traffic operation is tactical and responsive to the existing conditions in this time. From the air traffic management perspective of the ATC 106, this time frame is critical to safety of life, and the ATC 106 is typically reluctant to invest time into searching for efficiency opportunities on a per flight basis during this period. Furthermore, the ATC 106 does not have access to information as to what preferences users have for their individual flights.

The operations enabled by embodiments of systems and methods in accordance with the present disclosure are not just relevant in the near term look-ahead time horizon (e.g. 1 to 45 minutes). The en route efficiency improvements, along with metering and arrival management, provide a capability to operate full mission 4D trajectory operations. The 4D trajectory may be deemed "full mission" because even while the near term precise trajectory is being replanned, downstream considerations are considered. For example, an aircraft may be given an advisory to request an efficiency improvement opportunity not only because it saves time and fuel but also because it positions the aircraft to top of descent at the right time to initiate a tailored arrival. Thus, embodiments of systems and methods in accordance with the present disclosure consider the entire end-to-end aircraft trajectory until arrival even as decisions are made with respect to the operation in the near term.

Figure 5:
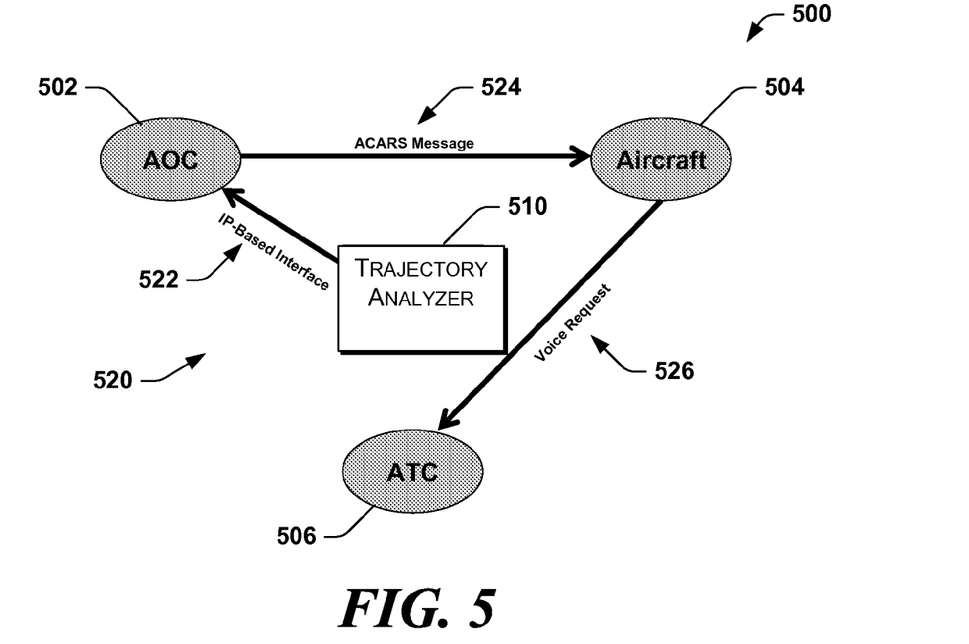
FIG. 5 is a schematic representation of a system for performing real-time flight trajectory revisions in a first mode of operation in accordance with another embodiment of the invention.

It will be appreciated that embodiments of systems and methods in accordance with the present disclosure may be implemented in a variety of different system configurations. For example, FIG. 5 is a schematic representation of a system 500 for performing real-time flight trajectory revisions in accordance with an embodiment of the invention. In this embodiment, the system 500 includes an Airline Operation Control (AOC) 502, an aircraft 504, and an Air Traffic Control (ATC) 506. The AOC 502, the aircraft 504, and the ATC 506 may be in operative communication in accordance with existing communication systems and methods. The system 500 also includes a trajectory analyzer 510 that is configured to receive and analyze various inputs regarding the operating environment of the aircraft 504.

Referring again to FIG. 5, in operation, the trajectory analyzer 510 may examine the real-time surveillance environment to track positions of all aircraft in flight, process their plan of operation, and determine a future expected operating picture. Based on one or more of the inputs 512, including user-specific objectives, user-specific proprietary data, high fidelity aircraft models, and other possible user-specific inputs, winds, weather, airspace structure and procedures, and constraints in the system 500, the trajectory analyzer 510 may examine whether there are any efficiency improvement opportunities (e.g. opportunities 314 shown in FIG. 3) for an individual flight (e.g. aircraft 504). The trajectory analyzer 510 identifies such options in consideration of separation requirements for ATC (i.e. conflict-checked), and in some embodiments, only brings an efficiency improvement opportunity 314 to light if it is expected to be accepted by ATC.

The trajectory analyzer 510 can deliver the opportunity 314 to a user (e.g. an airline operator) in a variety of ways. For example, as shown in FIG. 5, in a first operating mode 520, the trajectory analyzer 510 communicates the information to the AOC 502 (as shown in FIG. 5) via an internet protocol (IP) based communication 522, and the AOC 502 may communicate the efficiency improvement opportunity 314 to the aircraft 504 via an Aircraft Communication Addressing and Reporting System (ACARS) message 524. Alternately, the trajectory analyzer 510 may transmit the opportunity 514 directly to the aircraft 504. In turn, if the efficiency improvement opportunity 314 is acceptable to the user, the user may request the flight trajectory revision identified in the efficiency improvement opportunity 314, such as by having the aircraft 504 issue a voice request 526 to the ATC 506. If approved by the ATC 506, the aircraft 504 may implement the flight trajectory revision as requested.

Figure 6:
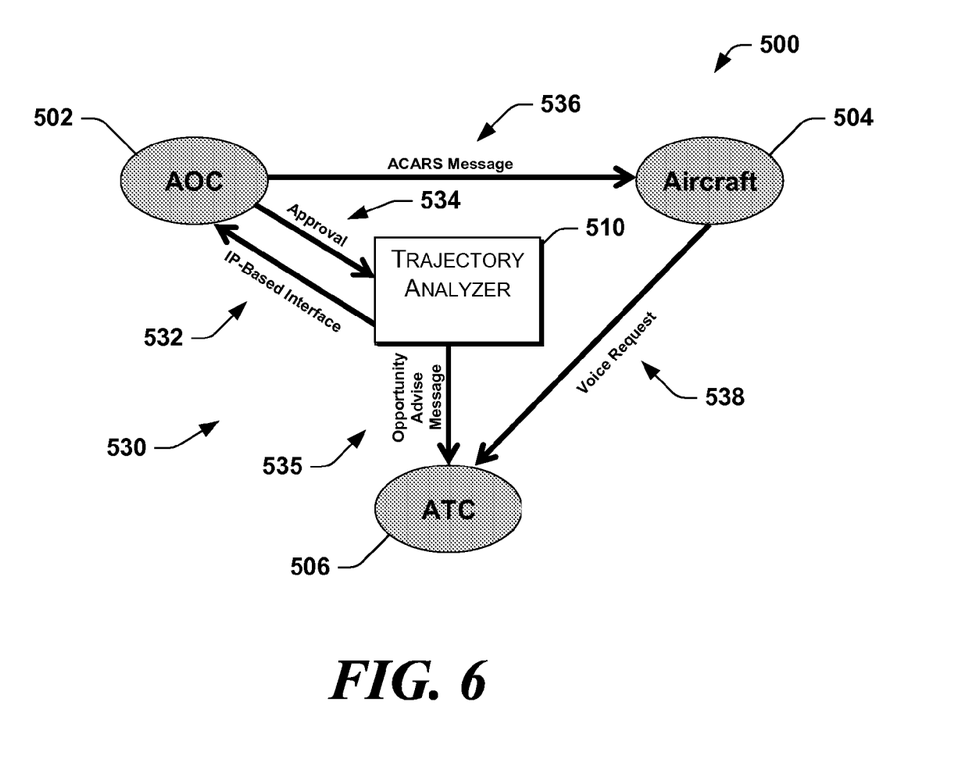
FIG. 6 is a schematic representation of the system of FIG. 5 in a second mode of operation.

The system 500 may operate in alternate modes of operation. For example, FIG. 6 is a schematic representation of the system 500 in a second mode of operation 530. In this embodiment, the trajectory analyzer 510 communicates the identified efficiency improvement opportunity 314 (FIG. 3) to the AOC 504 via an IP-base communication 532, and the AOC 504 communicates an approval 534 back to the trajectory analyzer 510. The trajectory analyzer 510 then transmits an opportunity advisory message 535 to the ATC 506 to let the ATC 506 know of the opportunity that has been identified. Next, the AOC 504 transmits a message 536 (e.g. an ACARS message) identifying the opportunity 314 to the aircraft 504, and in turn, the aircraft 504 transmits a request 538 (e.g. a voice request) to the ATC 506 requesting to implement the efficiency improvement opportunity 314. Because the ATC 506 has previously received the opportunity advisory message 535 prior to the request 538, the ATC 506 may have an improved situational awareness, and may be better able to provide a prompt response to the request 538. Again, if approved by the ATC 506, the aircraft 504 may implement the flight trajectory revision as requested.

Figure 7:
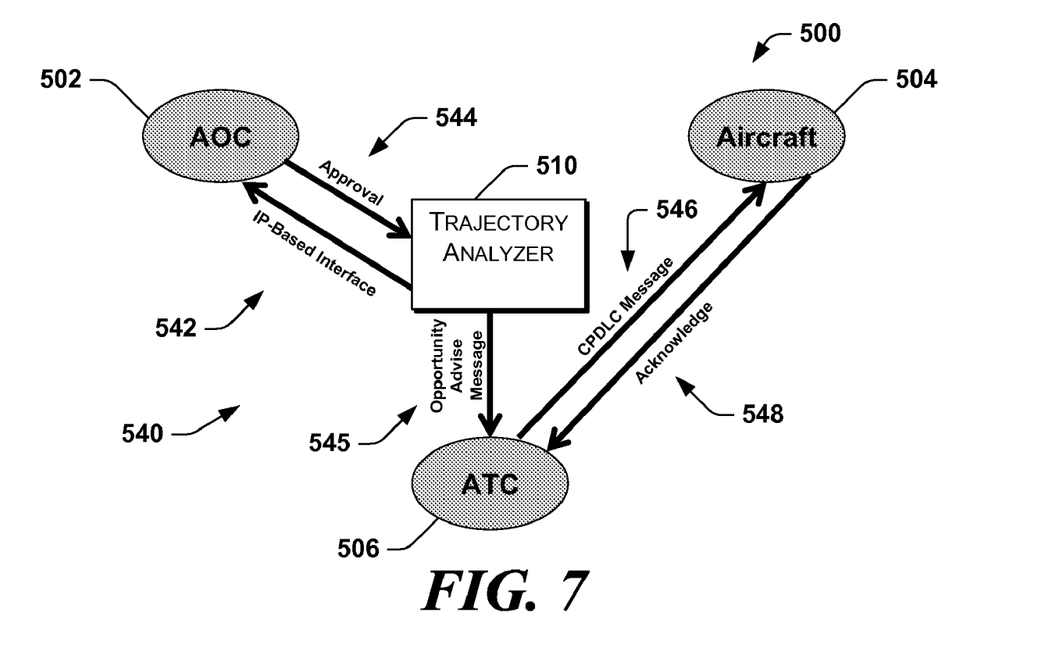
FIG. 7 is a schematic representation of the system of FIG. 5 in a third mode of operation.

FIG. 7 is a schematic representation of the system 500 in a third mode of operation 540. In this embodiment, the trajectory analyzer 510 communicates the identified improvement opportunity 314 to the AOC 504 via an IP-base communication 542, and the AOC 504 communicates an approval 544 back to the trajectory analyzer 510. The trajectory analyzer 510 then transmits an opportunity advisory message 545 to the ATC 506. If the ATC 506 approves of the opportunity 314, the ATC 506 transmits an instruction 546 (e.g. a Controller-Pilot Datalink Communication (CPDLC)) to the aircraft 504 in accordance with the improving opportunity 314. The aircraft 504 responds with an acknowledgement 548 back to the ATC 504, and implements the flight trajectory revision as instructed.

Embodiments of systems and methods including the trajectory analyzer 510 may provide significant advantages over existing air traffic management systems. Unlike previously-developed systems (e.g. "Direct To" and URET), the trajectory analyzer 510 may consider and identify improvement opportunities 314 from a broader perspective of possible inputs 512, including user-specific objectives, user-specific proprietary data, high fidelity aircraft models, and other possible user-specific inputs. In this way, the trajectory analyzer 510 may be configured to identify and propose efficiency improvement opportunities 314 from a broader perspective that includes considerations that may be important or unique to an individual user. Beyond searching for a "direct to" opportunity, embodiments of systems and methods in accordance with the present disclosure may search across multiple fix opportunities, altitude change options, alternative fixes, speed adjusts, and other possible opportunities, and may identify opportunities continuously along a flight trajectory. Possible users who may benefit from embodiments of methods and systems in accordance with the present disclosure include, for example, commercial and private passenger airlines, air-freight companies, governmental entities (e.g. postal service, military organizations, etc.), or any other suitable users as well as the ATC provider.

Embodiments of systems and methods including the trajectory analyzer 510 may advantageously focus on user objectives (e.g. airline objectives) like efficiency and capacity, while remaining outside of the ATC's safety of life and separation assurance control loop. The ATC 506 is still responsible for separating aircraft, but with the conflict probe capability within the trajectory analyzer 510, it is envisioned that there may be less conflicts for the controller to manage. In addition, because the trajectory analyzer 510 remains outside of the ATC's safety of life loop and may be implemented through current communications systems (e.g. voice, ACARS, and CPDLC communications), the trajectory analyzer 510 may be feasibly implemented with relatively little impact on current operational procedures.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A system for actively analyzing air traffic conditions based on a plurality of inputs, the system comprising:
    an analysis component configured to produce at least one conflict-checked flight trajectory revision that is operationally preferred for an end-to-end flight trajectory of an operating vehicle that includes an arrival phase; and
    a communications component configured to communicate the at least one conflict-checked flight trajectory revision.

2. The system of claim 1, wherein the plurality of inputs includes at least one of an airline operational preference specific to an individual aircraft or flows of aircraft, live air traffic surveillance data, live flight plan data, weather and wind data, high fidelity aircraft performance models, an airline-specific business objective, and an airspace constraint.

3. The system of claim 1, wherein the analysis component and the communications component are further configured to provide the conflict-checked operationally preferred flight trajectory revision in real time during operation of the operating vehicle.

4. The system of claim 1, wherein the analysis component includes an opportunity trajectory generator configured to analyze at least one possible flight re-plan scenario which may be operationally preferred to the currently filed trajectory, the opportunity trajectory generator being further configured to consider a ranked hierarchy of re-plan options.

5. The system of claim 1, wherein the analysis component is further configured to:
    generate at least one opportunity trajectory;
    analyze the at least one opportunity trajectory in view of at least one operator-specified objective; and
    determine whether a conflict exists between the at least one opportunity trajectory and another flight path of another operating air vehicle.

6. The system of claim 5, wherein analyzing the at least one opportunity trajectory includes converging on the at least one opportunity trajectory based on a hierarchy of ranked criteria.

7. A method of operating an air vehicle based on a plurality of inputs, comprising:
    determining at least one conflict-checked flight trajectory revision for an operating air vehicle based on (1) a plurality of inputs that includes a hierarchy of criteria that are ranked based at least in part on operator preferences or a business model and (2) an operator-specified objective, the at least one conflict-checked flight trajectory revision at least partially improving the chances of meeting the operator-specified objective;
    providing the at least one conflict-checked flight trajectory revision to an airspace user; and
    upon approval of the at least one conflict-checked flight trajectory revision by the airspace user, transmitting the at least one conflict-checked flight trajectory revision to an air traffic authority.

8. The method of claim 7, wherein providing the at least one conflict-checked flight trajectory revision to an airspace user includes providing the at least one conflict-checked flight trajectory revision to an operator's operations center, the method further including communicating the at least one conflict-checked flight trajectory revision from the operator's operations center to at least one of the operating air vehicle and an air navigation service provider.

9. The method of claim 7, wherein providing the at least one conflict-checked flight trajectory revision to an airspace user includes providing the at feast one conflict-checked flight trajectory revision to an operator's operations center, the method further including:
- communicating an approval from the operator's operations center back to the communication component;
- transmitting an opportunity advisory message from the communication component to an air navigation service provider;
- communicating the at least one conflict-checked flight trajectory revision to a pilot of the operating air vehicle; and
- transmitting a request from the pilot to the air navigation service provider to perform the at least one conflict-checked flight trajectory revision.

10. The method of claim 7, wherein providing the at least one conflict-checked flight trajectory revision to an airspace user includes providing the at least one conflict-checked flight trajectory revision to an operator's operations center, the method further including:
- communicating an approval from the operator's operations center to at least one of the communication component and, if a set of pre-established conditions is satisfied, to an air navigation service provider; and
- if approved by the air navigation service provider, transmitting an instruction from the air navigation service provider to a pilot of the operating air vehicle to perform the at least one conflict-checked flight trajectory revision.

11. The method of claim 7, wherein the at least one conflict-checked flight trajectory revision includes laterally bypassing an intermediate waypoint along a pre-planned flight path.

12. The method of claim 7, wherein the at least one conflict-checked flight trajectory revision includes a vertical improvement opportunity that is a different altitude than the current altitude of flight.

13. The method of claim 7, wherein the at least one conflict-checked flight trajectory revision includes identifying a combination of at least one auxiliary waypoint and at least one vertical displacement from a current path of flight that at least one of enables improved efficiency and avoids an operating constraint.

14. The method of claim 7, wherein the at least one conflict-checked flight trajectory revision may involve adjustments to at least one of current and planned en route speeds of the operating air vehicle to better meter traffic through and align operations with constrained system resources.

15. The method of claim 7, wherein the at least one conflict-checked flight trajectory revision may be specifically crafted to position the operating air vehicle for improved management during an arrival phase of flight through at least one of a continuous descent approach and a tailored arrival.

16. The method of claim 7, wherein the at least one conflict-checked flight trajectory revision enables a four-dimensional trajectory operation, including an operation planned with a latitude, a longitude, an altitude, and a time, in a near-term operating environment, including an approximately one to approximately forty-five minute look-ahead.

17. The method of claim 7, wherein the at least one conflict-checked flight trajectory revision includes a recommended near term trajectory replanning that considers an entire end-to-end aircraft trajectory up to and including arrival.

18. A method, comprising:
- determining at least one conflict-checked flight trajectory revision for an operating air vehicle that at least partially satisfies an Air Navigation Service Provider (ANSP) objective, wherein determining includes:
  - collectively considering one or more airspace user objectives, and
  - selecting a candidate conflict-checked flight trajectory revision that is at least one of neutral to or beneficial to an objective of the airspace user, the conflict-checked flight trajectory revision including a new end-to-end aircraft trajectory up to and including an arrival phase;
- proposing the candidate conflict-checked flight trajectory revision to the ANSP; and
- altering an existing flight trajectory during a flight of the operating air vehicle upon approval of the candidate conflict-check flight trajectory revision by the ANSP.

19. The method of claim 18, wherein partially satisfying an ANSP objective includes at least one of mitigation of system congestion in a busy airspace, pre-aligning traffic for improved throughput at busy airports, and efficient arrival/departure operations.

20. The method of claim 18, wherein collectively considering one or more airspace user objectives includes considering one or more operator flight trajectory revisions that meet ANSP objectives that do not have a negative impact on the airspace user's time, cost, emissions or network performance to operate.

* * * * *